(12) United States Patent
Gunasekara et al.

(10) Patent No.: US 11,881,217 B2
(45) Date of Patent: Jan. 23, 2024

(54) SOLUTION GUIDED RESPONSE GENERATION FOR DIALOG SYSTEMS

(71) Applicant: International Business Machines Corporation, Armonk, NY (US)

(72) Inventors: Chulaka Gunasekara, New Hyde Park, NY (US); Jatin Ganhotra, White Plains, NY (US); Sachindra Joshi, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 17/363,063

(22) Filed: Jun. 30, 2021

(65) Prior Publication Data

US 2023/0005475 A1 Jan. 5, 2023

(51) Int. Cl.
| | |
|---|---|
| *G10L 15/22* | (2006.01) |
| *G10L 15/06* | (2013.01) |
| *G10L 15/26* | (2006.01) |
| *G06N 20/00* | (2019.01) |
| *H04M 3/493* | (2006.01) |

(52) U.S. Cl.
CPC ............. *G10L 15/22* (2013.01); *G06N 20/00* (2019.01); *G10L 15/063* (2013.01); *G10L 15/26* (2013.01); *H04M 3/4936* (2013.01); *G10L 2015/0638* (2013.01); *G10L 2015/225* (2013.01)

(58) Field of Classification Search
CPC ....... G10L 15/22; G10L 15/063; G10L 15/26; G10L 2015/0638; G10L 2015/225; G06N 20/00; H04M 3/4936
USPC ........................................................ 704/275
See application file for complete search history.

(56) References Cited

U.S. PATENT DOCUMENTS

| | | | |
|---|---|---|---|
| 5,274,801 A | 12/1993 | Gordon | |
| 6,510,411 B1 | 1/2003 | Norton | |
| 8,990,126 B1 | 3/2015 | Bangalore | |
| 10,332,033 B2 | 6/2019 | Kwon | |
| 10,496,705 B1 * | 12/2019 | Irani | ....................... H04L 51/18 |

(Continued)

FOREIGN PATENT DOCUMENTS

KR 20170088164 A 8/2017

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

*Primary Examiner* — Susan I McFadden
(74) *Attorney, Agent, or Firm* — Anthony M. Pallone

(57) ABSTRACT

According to one embodiment, a method, computer system, and computer program product for solution guided generation of responses for dialog systems is provided. The embodiment may include receiving, by a processor, first voice data associated with a first user utterance in conversation in a guided dialog system. The embodiment may include identifying from the first voice data a first topic of a set of topics associated with the first user utterance. The embodiment may include identifying a first solution associated with the first topic. The first solution having one or more solution segments for accomplishing a task related to the topic. The embodiment may include generating a first response for a second user based on a first solution segment of the first solution and the first voice data.

20 Claims, 5 Drawing Sheets

(56) References Cited

U.S. PATENT DOCUMENTS

| | | | |
|---|---|---|---|
| 10,540,967 B2 | 1/2020 | Perez | |
| 10,706,086 B1 * | 7/2020 | Didericksen | G06F 16/3329 |
| 10,740,370 B2 | 8/2020 | Campbell | |
| 10,762,902 B2 * | 9/2020 | Garikapati | G06F 3/0484 |
| 10,936,663 B2 | 3/2021 | Yu | |
| 11,069,356 B2 * | 7/2021 | Cohen | G10L 15/22 |
| 11,151,982 B2 * | 10/2021 | Tomkins | G06N 3/04 |
| 11,394,799 B2 * | 7/2022 | Jackson | H04L 67/306 |
| 11,657,813 B2 * | 5/2023 | Peterson | G10L 17/00 |
| | | | 704/275 |
| 2015/0179170 A1 | 6/2015 | Sarikaya | |
| 2018/0053119 A1 | 2/2018 | Zeng | |
| 2019/0066660 A1 | 2/2019 | Liang | |
| 2019/0340201 A1 | 11/2019 | Havens | |
| 2020/0004874 A1 | 1/2020 | Gupta | |
| 2022/0199079 A1 * | 6/2022 | Hanson | H04L 51/02 |

* cited by examiner

SOLUTION GUIDED RESPONSE GENERATION FOR DIALOG SYSTEMS

BACKGROUND

The present disclosure relates generally to the field of dialog systems, and more specifically to solution guided generation of responses for dialog systems.

Dialog systems are intelligent machines that can understand language and conduct a written or verbal conversation with a user. Two common methods of creating conversation systems are: subject matter experts ("SMEs") manually creating dialog flows using domain knowledge and data driven modeling. Data driven modeling includes learning from chatlogs where problem solving is implicitly learnt from both chatlogs and external knowledge, which provides more of a basis to generate responses.

SME based modeling is time-consuming, costly, and manual. Further, learning from chatlogs is difficult as models need to learn language as well as business logic. In either case, identifying necessary external information and representing it is challenging. Accordingly, solutions for data driven dialog systems that are less costly, labor-intensive, and easier to model are needed.

SUMMARY

Embodiments of the present disclosure include a method, computer program product, and system for solution guided generation of responses for dialog systems.

In some embodiments, a processor may receive first voice data associated with a first user utterance in conversation in a guided dialog system. The processor may identify from the first voice data a first topic of a set of topics associated with the first user utterance. The processor may identify a first solution associated with the first topic, the first solution having one or more solution segments for accomplishing a task related to the topic. The processor may generate a first response for a second user based on a first solution segment of the first solution and the first voice data.

In some embodiments, a processor may receive first voice data associated with a first user utterance in conversation in a guided dialog system. The processor may identify from the first voice data a first topic of a set of topics associated with the first user utterance. The processor may identify a first solution associated with the first topic, the first solution having one or more solution segments for accomplishing a task related to the topic. The processor may generate the first solution using a document corpus from an entity relevant to the first topic. The processor may generate a first response for a second user based on a first solution segment of the first solution and the first voice data.

In some embodiments, a processor may receive first voice data associated with a first user utterance in conversation in a guided dialog system. The processor may identify from the first voice data a first topic of a set of topics associated with the first user utterance. The processor may identify a first solution associated with the first topic, the first solution having one or more solution segments for accomplishing a task related to the topic. The processor may generate the first solution using a text generation artificial intelligence model that generates solutions from sample conversations. The processor may generate a first response for a second user based on a first solution segment of the first solution and the first voice data.

In some embodiments, the first response may be generated using a sequence to sequence machine learning model.

In some embodiments, the first topic may be identified using a text classification model.

In some embodiments, a processor may receive second voice data associated with a second user utterance in the conversation in the guided dialog system. The processor may confirm that the second user utterance is not associated with another topic of the set of topics. The processor may generate a second response for the second user based on the first voice data, the first response of the second user, the second voice data, and a second solution segment of the first solution.

In some embodiments, a processor may receive third voice data associated with a third user utterance in the conversation in the guided dialog system. The processor may identify a second topic associated with the third user utterance. The processor may identify a second solution associated with the second topic. The processor may generate a third response for the second user based on the first voice data, the first response of the second user, the second voice data, the second response of the second user, the third voice data, and a solution segment of the second solution.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
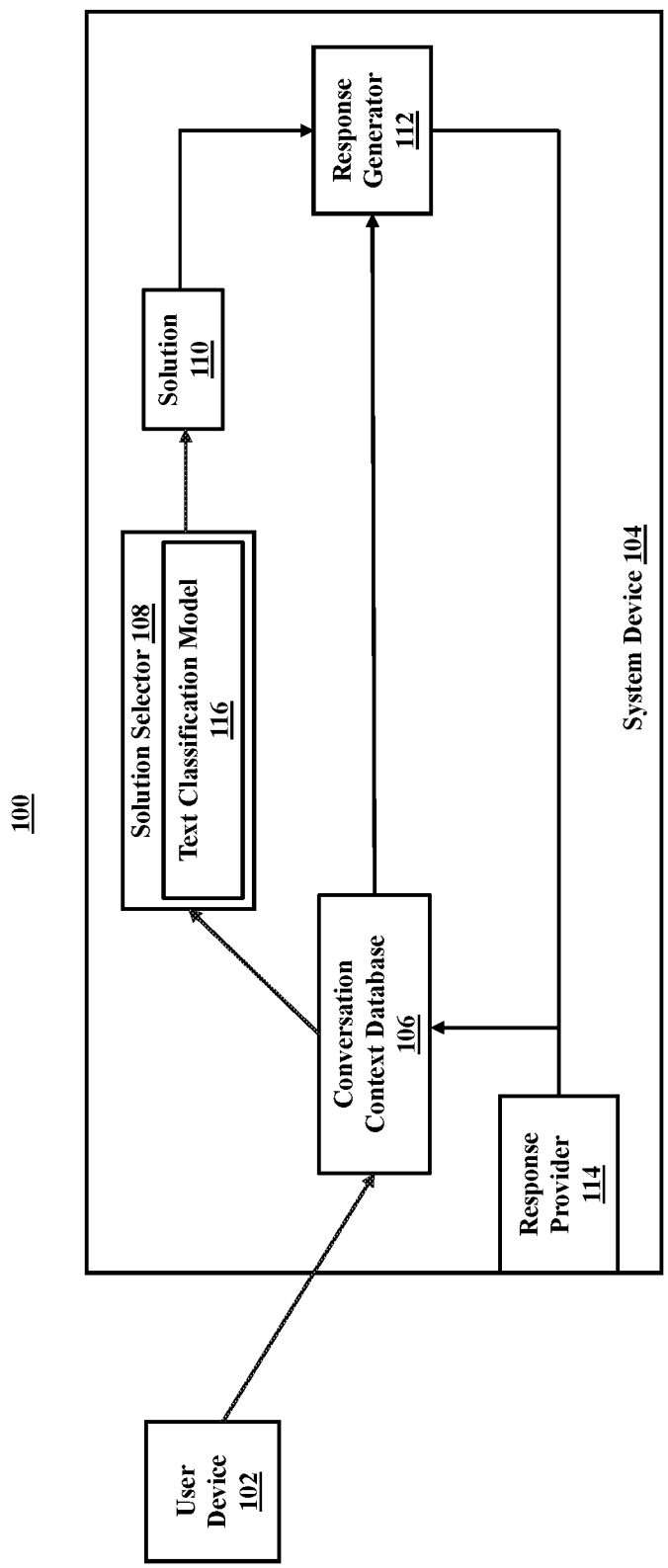
FIG. 1 is a block diagram of an exemplary system for solution guided generation of responses, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of dialog systems, and more specifically to solution guided generation of responses for dialog systems. While the present disclosure is not necessarily limited to such applications, various aspects of the disclosure may be appreciated through a discussion of various examples using this context.

In some embodiments, a processor may receive first voice data associated with a first user utterance in conversation in a guided dialog system. In some embodiments, the processor may identify from the first voice data a first topic of a set of topics associated with the first user utterance. In some embodiments, the first topic may be identified using a text classification model.

In some embodiments, the user utterance may relate to a request, issue, concern, or problem to address, resolve, solve, or accomplish through the conversation in the guided dialog system. In some embodiments, the conversation may be a communication between a caller (e.g., first user) and an agent (e.g., a second user) where the caller and agent take turns speaking or responding to the other. In some embodiments, the first voice data may include a text transcript of at least a portion of the conversation spoken by the first user during the turn(s) of the first user to speak in the conversation. In some embodiments, the guided dialog system may be utilized by a virtual assistant to help users accomplish a wide variety of tasks and may include conversation between an agent and users to accomplish those tasks.

In some embodiments, the text classification model may analyze the text spoken by the first user and assign a set of predefined tags or categories (e.g., the first topic) to the text based on the context of the text. In some embodiments, the text classification model may utilize natural language processing for sentiment analysis, topic detection, intent detection, entity identification, and language detection. In some embodiments, the topics identified may include, but are not limited to, one or a combination of symptoms, topics, actions, intents, requests, issues, concerns, or problems or any other identifiers associated with a task, request, issue, concern, or problem the user would like assistance with related to the services or systems with respect to which the dialog system operates.

For example, the guided dialog system may be initiated by a caller making a verbal request to extend a due data for payment of a utility bill. The caller may make an initial request to the system by stating that "I would like an extension for paying my electric bill." The entire user utterance may be transcribed and provided to an artificial intelligence model with natural language processing capability that identifies a topic of the user utterance from the voice data. The topic of the user utterance may relate to a topic about which the user is inquiring, a problem with which the user would like assistance, an issue or concern that the caller would like addressed, an action that the user would like performed, etc. From the user utterance "I would like an extension for paying my electric bill," a topic of "payment extension" may be identified.

In some embodiments, the processor may identify a first solution associated with the first topic. In some embodiments, the first solution may have one or more solution segments for accomplishing a task related to the topic. In some embodiments, the processor may identify the first solution based on the identification of the first topic. In some embodiments, the one or more solution segments may be a series of steps, actions, or communications through which the task related to the topic may be accomplished. For example, for the topic "payment extension," the processor may identify a solution that includes a series of steps through which the agent may accomplish the task of obtaining a payment extension for the caller. To obtain a payment extension for the caller, the solution segments may include the steps of: confirming the phone number of the caller; sending a pin number to the caller and requesting that the caller provide the pin number to the agent; asking the caller for the date on which he/she would like to settle the payment (e.g., obtain an extension until); reminding the caller that it is important to comply with the new payment arrangement and that failure to comply may result in late fees; recording the payment extension in a database; informing the caller that the payment extension has been implemented; and providing the caller with a reference number.

In some embodiments, the one or more solution segments may include subtasks that need to be performed, including: obtaining various types of information from the user, informing the caller of various consequences of performing the action, verifying relevant background information from the caller (e.g., verifying the user's identity or account information), and obtaining information related to the task that needs to be accomplished (e.g., when would the user like to extend the due date until). In some embodiments, the subtasks or solution segments may include: communication exchanges, inquiries, instructions to be provided, questions to be asked, answers to be provided, information to be obtained, user response to be received, etc. In some embodiments, the solution and the solution segments may be a road map or instructions for how to accomplish the task through communications with the user via the guided dialog system.

In some embodiments, the solution may be selected by an artificial intelligence ("AI") model that links the selected solution to the topic identified from the voice data. In some embodiments, the AI model may be a text classification model that utilizes natural language processing. In some embodiments, the solution selecting model may be trained using data sets that link a solution and a topic to text from conversations between two users (e.g., a caller and an agent).

In some embodiments, the processor may generate a first response for a second user based on a first solution segment of the first solution and the first voice data. For example, based on the first voice data, "I would like an extension for paying my electric bill," and the first solution segment of the first solution, "confirm the phone number of the caller," the first response for the agent (e.g., the second user) may be: "I can help you with that, but first I need to verify your identity. Can you please provide the phone number associated with the account?". In some embodiments, the agent (e.g., the second user) is an automated agent that relays the response to the user/caller.

In some embodiments, the first response may be generated using a sequence to sequence machine learning model. In some embodiments, the sequence to sequence model may be a deep learning model that generates text. In some embodiments, the sequence to sequence model may be a deep learning model that generates text by using a recurrent neural network (RNN), a Long Short-Term Memory (LSTM) or a Grated Recurrent Unit (GRU) architecture. In some embodiments, the context for each item is the output from the previous step. In some embodiments, the primary components of the sequence to sequence model are an encoder and a decoder network. In some embodiments, the encoder turns each item into a corresponding hidden vector containing the item and its context. In some embodiments, the decoder reverses the process, turning the vector into an output item, using the previous output as the input context. In some embodiments, the sequence to sequence model may include BART, generative pre-trained transformer 2 ("GPT2"), generative pre-trained transformer 3 ("GPT3"), etc. In some embodiments, the sequence to sequence model may be trained to take both the conversation context (e.g., user utterance(s) and response(s) by the agent) and identified solutions (or solution segments) as the inputs resulting in the outputted generated response for the second user.

In some embodiments, the processor may receive second voice data associated with a second user utterance in the conversation in the guided dialog system. In some embodiments, the processor may confirm that the second user utterance is not associated with another topic of the set of topics. In some embodiments, the processor may generate a second response for the second user based on the first voice data, the first response of the second user, the second voice data, and a second solution segment of the first solution.

Continuing the previous example, the second voice data may be "my phone number is 123 345 6443." The processor may analyze the text provided by the user to determine that the information does not relate to a second topic. The processor may then generate a second response based on the conversation so far and the second solution segment of the first solution. The processor may input into machine learning model the first and second voice data and the first response of the agent:

First user: "I would like an extension for paying my electric bill."

Agent: "I can help you with that, but first I need to verify your identity. Can you please provide the phone number associated with the account?".

First user: "My phone number is 123 345 6443."

The processor may also input into the machine learning model the second solution segment of the first solution, "sending a pin number to the caller and requesting that the caller provide the pin number to the agent" to generate a second response "Our system will be sending you a pin number by text message to your phone. Please provide me with the four digit number sent to you."

In some embodiments, the processor may receive third voice data associated with a third user utterance in the conversation in the guided dialog system. In some embodiments, the processor may identify a second topic associated with the third user utterance. In some embodiments, the processor may identify a second solution associated with the second topic. In some embodiments, the processor may generate a third response for the second user based on the first voice data, the first response of the second user, the second voice data, the second response of the second user, the third voice data, and a solution segment of the second solution.

Continuing the prior example, the third user utterance may be "the pin number I received was 3476, but actually, I would like to update the address associated with this account." The processor may identify the second topic "updating account information" in the third user utterance. The processor may identify a second solution providing a series of steps to update account information. The processor may then generate a third response for the agent based on the entire conversation history (e.g., the first, second, third user utterance and the first and second responses of the second user/agent) and a solution segment of the solution for updating account information. The solution segment for the updating account information solution may be to "verify the type of account information to be updated." The third response generated for the agent may be "You would like to update the address on your account profile. Is that correct?" The third response may be generated based on the conversation history and the solution segments for the solution associated with updating account information.

In some embodiments, each of the first, second, and third response may be predictively generated based on patterns detected by the machine learning model.

In some embodiments, the solution (e.g., first solution or second solution) may be identified and prepared by a subject matter expert. In some embodiments, the one or more steps (e.g., solution segments) included in the solution may be manually created, generated, derived, or prepared by a subject matter expert. In some embodiments, the subject matter expert may be able to identify the series of solution segments that are needed to accomplish the task related to the topic based on the subject matter expert's knowledge of the processes, steps, or actions that may be taken to accomplish the task.

In some embodiments, the subject matter expert may review sample exchanges between a user and an agent and identify steps or processes that are needed to accomplish a task related to the topic based on the communications between the user and agent. In some embodiments, the subject matter expertise may review any other relevant reference materials (e.g., manuals, how to websites, procedure bulletins) that provide information regarding how to accomplish the task (e.g., information that helps the subject matter expert determine, identify, or breakdown what steps need to be taken). Regardless of the subject matter expert embodiment used, the information provided by the subject matter expert is tagged with an annotation and presented to the disclosed system for storage and subsequent use during a conversation. Further, the information provided by the subject matter expert may be analyzed by a natural language processing system and stored/tagged by topic/subtopic.

In some embodiments, the solution (e.g., first solution or second solution) may be generated using a text generation artificial intelligence model that generates solutions from sample conversations. In some embodiments, the text generation artificial intelligence model may generate the required solution token by a token grounded on the available conversation context. In some embodiments, the text generation artificial intelligence model may include BART, GPT2, and GPT3.

In some embodiments, the text generation model may be trained using transcripts of conversations between a caller and an agent that have been annotated by a subject matter expert. In some embodiments, the sample transcripts may be annotated to identify portions of the conversations that relate to a solution component. In some embodiments, the text generation artificial intelligence model may be trained to associate portions of the conversation (e.g., language spoken by the caller or the agent) with a solution component.

In some embodiments, once the text generation model is trained, the text generation model may be utilized to generate solutions by applying the text generation model to a corpus of conversations. In some embodiments, based on the sample conversations provided as input, the text generation model may be able to output additional solutions (e.g., solutions that are made of a series of solution segments) from the sample conversations in the conversation corpus.

In some embodiments, the solution (e.g., first solution or second solution) may be generated using a document corpus from an entity relevant to the topic (e.g., the first topic or second topic, respectively). In some embodiments, the entity relevant to the topic may be an individual, group of individuals, organization, database, library, etc. that has or may provide access to information that relates to the topic, the solution associated with the topic, and/or one or more solution segments for accomplishing a task related to the topic.

In some embodiments, solutions may be generated using the document corpus using a rule-based method. In some embodiments, the rule-based method may identify portions of documents in the document corpus that relate to topics, solutions, or solution segments. In some embodiments, the rules may describe how to identify topics, solutions, or solution segments and the conversation text (e.g., from a user utterance) with which they are associated.

For example, a solution may be generated using rules that relate to the Document Object Model ("DOM") elements on a specified set of webpages (e.g., webpages of an organization that provides step by step instructions to solve frequently encountered problems with products purchased from the organization). In some embodiments, the solutions that are generated using rules (e.g., related to DOM elements on webpages) may be reviewed by a subject matter expert (e.g., the author of the webpages). In some embodiments, feedback from the subject matter experts regarding the solutions may be used to update the rules based on which the solutions are generated.

In some embodiments, a subject matter expert may review certain documents (e.g., user manuals for a company's products) from the document corpus and generate or draft a solution from the passages. For example, the subject matter expert may provide annotations that identify which portions of the passages led to which subcomponent of the solution. In some embodiments, the annotations may be used to train a text generation model to generate other solution from similar documents. In some embodiments, the text generation model may learn how to link passages of user manuals to solution segments. In some embodiments, the text generation model may then generate new solutions from user manuals that it receives as input.

Referring now to FIG. 1, a block diagram of a system 100 for solution guided generation of responses is illustrated. System 100 includes a user device 102 and a system device 104. The system device 104 includes conversation context database 106, solution selector 108, solution 110, response generator 112, and response provider 114. The user device 102 and system device 104 are configured to be in communication with each other. The user device 102 and system device 104 may be any devices that contain a processor configured to perform one or more of the functions or steps described in this disclosure.

In some embodiments, system device 104 receives from the user device 102 first voice data associated with a first user utterance in a conversation. The first voice data is stored in the conversation context database 106. The solution selector 108 of the system device 104 identifies from the first voice data a first topic of a set of topics associated with the first user utterance and identifies a first solution 110 associated with the first topic. The first solution 110 has one or more solution segments for accomplishing a task related to the topic. The response generator 112 of the system device 104 generates a first response for a second user (e.g., an agent in the guided dialog system) based on a first solution segment of the first solution and the first voice data. In some embodiments, the response generator uses a sequence to sequence machine learning model to generate the response. The first response is communicated to the first user (e.g., to the user device 102) via the response provider 114.

In some embodiments, the first response is stored in the conversation context database 106 and used to generate a second response for the agent. In some embodiments, the system device 104 receives second voice data associated with a second user utterance in the conversation. In some embodiments, the solution selector 108 confirms that the second user utterance is not associated with another topic of the set of topics. In some embodiments, the solution selector may use text classification model 116 to confirm that the second user utterance is not associated with another topic of the set of topics. In some embodiments, the response generator 112 generates a second response for the agent based on the first voice data, the first response of the agent, the second voice data, and a second solution segment of the first solution.

In some embodiments, the first and second voice data and the first and second responses are stored in the conversation context database 106 and used to generate a third response for the agent. In some embodiments, the system device 104 receives third voice data associated with a third user utterance in the conversation. In some embodiments, the solution selector 108 identifies a second topic associated with the third user utterance. In some embodiments, the solution selector 108 identifies a second solution associated with the second topic. In some embodiments, the response generator 112 generates a third response for the agent based on the first voice data, the first response of the agent, the second voice data, the second response of the agent, the third voice data, and a solution segment of the second solution.

Figure 2:
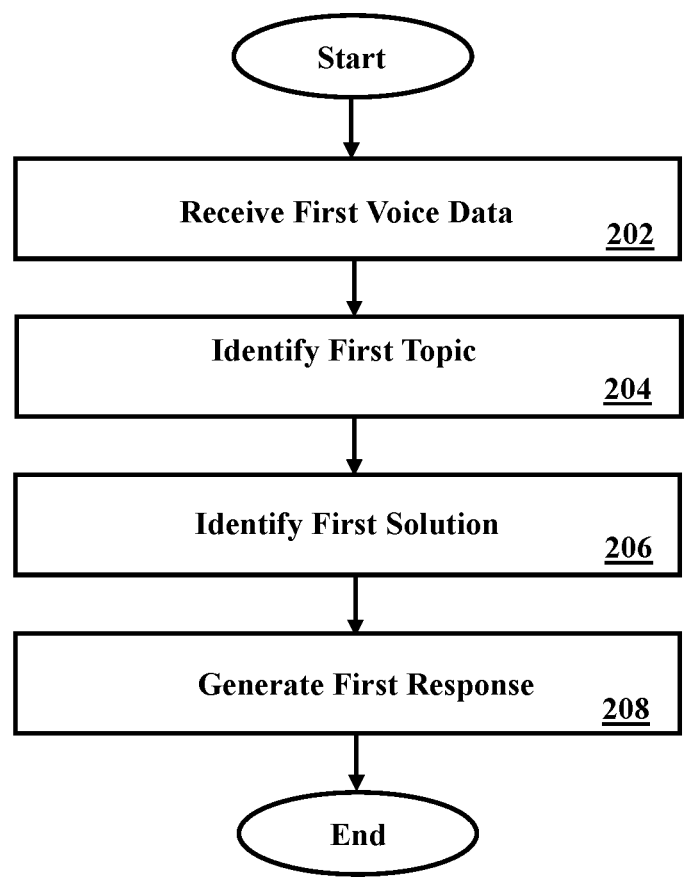
FIG. 2 is a flowchart of an exemplary method for solution guided generation of responses, in accordance with aspects of the present disclosure.

Referring now to FIG. 2, illustrated is a flowchart of an exemplary method 200 for solution guided generation of responses, in accordance with embodiments of the present disclosure. In some embodiments, a processor of a system may perform the operations of the method 200. In some embodiments, method 200 begins at operation 202. At operation 202, the processor receives first voice data associated with a first user utterance in conversation in a guided dialog system. In some embodiments, method 200 proceeds to operation 204, where the processor identifies from the first voice data a first topic of a set of topics associated with the first user utterance. In some embodiments, method 200 proceeds to operation 206. At operation 206, the processor identifies a first solution associated with the first topic, the first solution having one or more solution segments for accomplishing a task related to the topic. In some embodiments, method 200 proceeds to operation 208. At operation 208, the processor generates a first response for a second user based on a first solution segment of the first solution and the first voice data.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
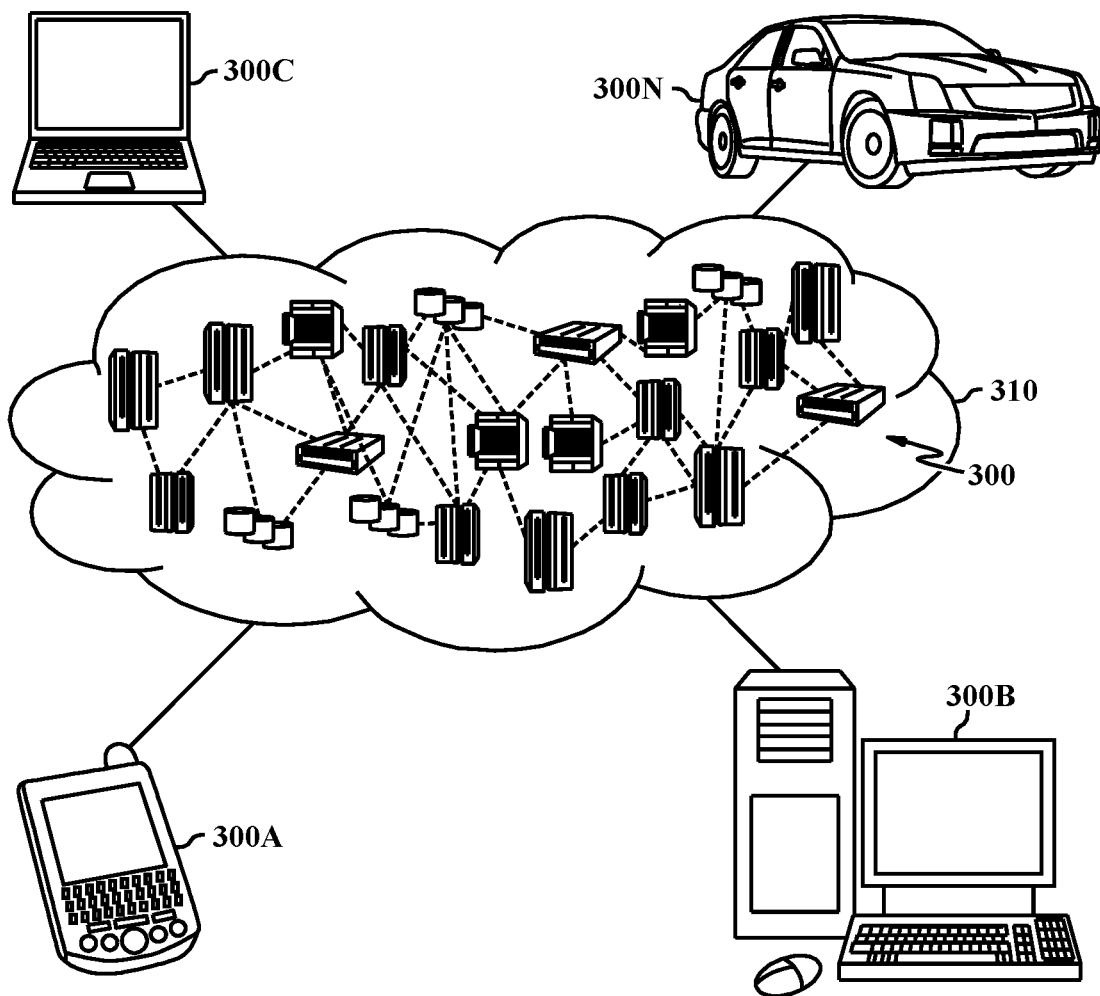
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
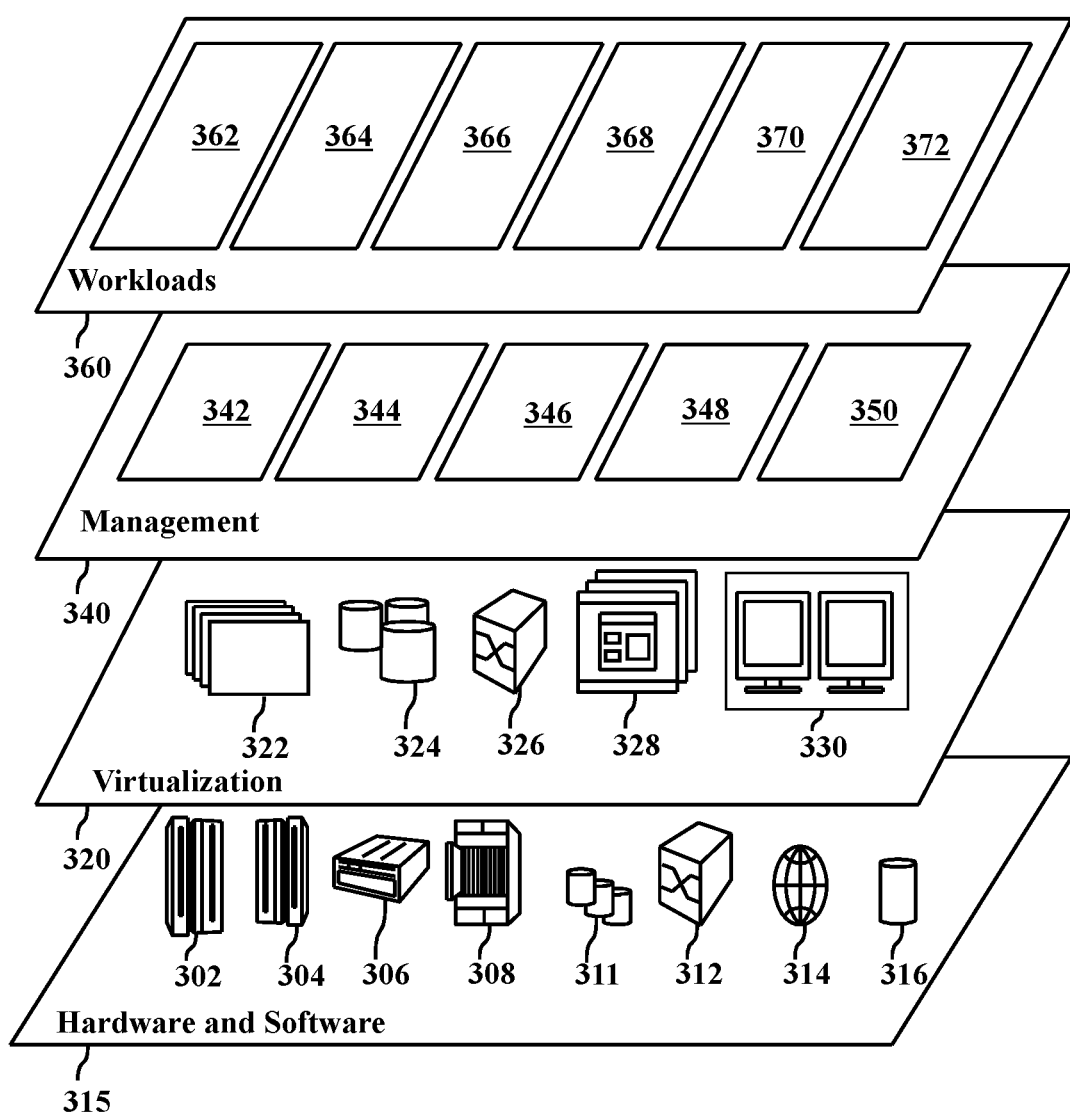
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and solution-guided generation of responses for dialog systems 372.

Figure 4:
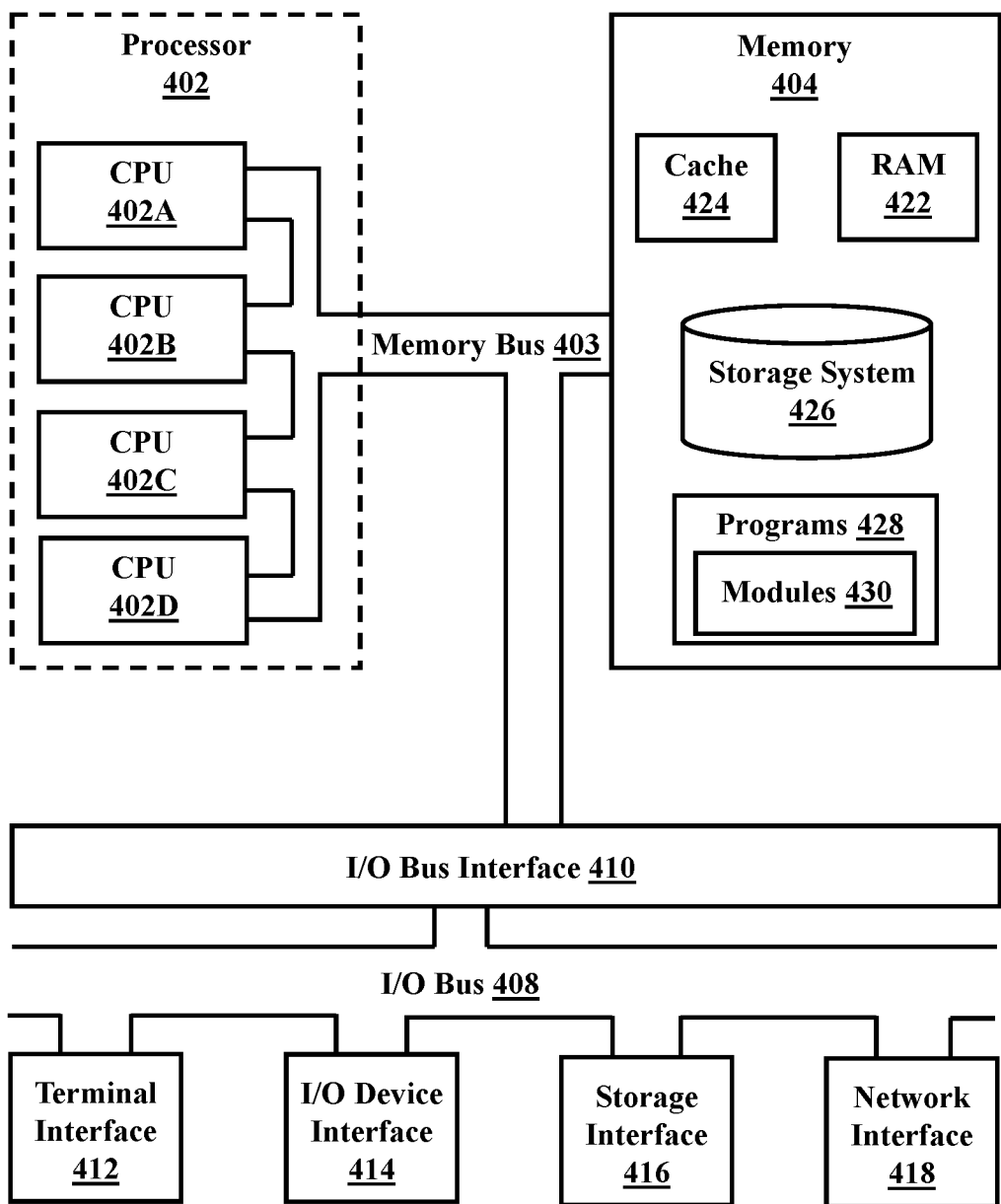
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:

receiving, by a processor, first voice data associated with a first user utterance of a first user in conversation with a second user in a guided dialog system, wherein the second user is an automated agent of the guided dialog system;

identifying from the first voice data a first topic of a set of topics associated with the first user utterance;
identifying a first solution associated with the first topic, the first solution having one or more solution segments for accomplishing a task related to the topic;
generating a first response for the second user based on a first solution segment of the first solution and the first voice data, wherein the first response is generated using a sequence to sequence machine learning model comprising a generative pre-trained transformer trained to take the first voice data and the first solution segment as inputs and output the first response; and
relaying, via the second user, the first response to the first user.

2. The method of claim 1, wherein the first topic is identified using a text classification model.

3. The method of claim 1, further comprising:
receiving second voice data associated with a second user utterance in the conversation in the guided dialog system;
confirming that the second user utterance is not associated with another topic of the set of topics; and
generating a second response for the second user based on the first voice data, the first response of the second user, the second voice data, and a second solution segment of the first solution.

4. The method of claim 3, further comprising:
receiving third voice data associated with a third user utterance in the conversation in the guided dialog system;
identifying a second topic associated with the third user utterance;
identifying a second solution associated with the second topic; and
generating a third response for the second user based on the first voice data, the first response of the second user, the second voice data, the second response of the second user, the third voice data, and a solution segment of the second solution.

5. A computer-implemented method, the method comprising:
receiving, by a processor, first voice data associated with a first user utterance of a first user in conversation with a second user in a guided dialog system, wherein the second user is an automated agent of the guided dialog system;
identifying from the first voice data a first topic of a set of topics associated with the first user utterance;
identifying a first solution associated with the first topic, the first solution having one or more solution segments for accomplishing a task related to the topic, wherein the first solution is generated using a text generation artificial intelligence model that generates solutions from sample conversations;
generating a first response for the second user based on a first solution segment of the first solution and the first voice data, wherein the first response is generated using a sequence to sequence machine learning model comprising a generative pre-trained transformer trained to take the first voice data and the first solution segment as inputs and output the first response; and
relaying, via the second user, the first response to the first user.

6. The method of claim 5, wherein the first topic is identified using a text classification model.

7. The method of claim 5, further comprising:
receiving second voice data associated with a second user utterance in the conversation in the guided dialog system;
confirming that the second user utterance is not associated with another topic of the set of topics; and
generating a second response for the second user based on the first voice data, the first response of the second user, the second voice data, and a second solution segment of the first solution.

8. The method of claim 7, further comprising:
receiving third voice data associated with a third user utterance in the conversation in the guided dialog system;
identifying a second topic associated with the third user utterance;
identifying a second solution associated with the second topic; and
generating a third response for the second user based on the first voice data, the first response of the second user, the second voice data, the second response of the second user, the third voice data, and a solution segment of the second solution.

9. A computer-implemented method, the method comprising:
receiving, by a processor, first voice data associated with a first user utterance of a first user in conversation with a second user in a guided dialog system, wherein the second user is an automated agent of the guided dialog system;
identifying from the first voice data a first topic of a set of topics associated with the first user utterance;
identifying a first solution associated with the first topic, the first solution having one or more solution segments for accomplishing a task related to the topic, wherein the first solution is generated using a document corpus from an entity relevant to the first topic;
generating a first response for the second user based on a first solution segment of the first solution and the first voice data, wherein the first response is generated using a sequence to sequence machine learning model comprising a generative pre-trained transformer trained to take the first voice data and the first solution segment as inputs and output the first response; and
relaying, via the second user, the first response to the first user.

10. The method of claim 9, wherein the first topic is identified using a text classification model.

11. The method of claim 9, further comprising:
receiving second voice data associated with a second user utterance in the conversation in the guided dialog system;
confirming that the second user utterance is not associated with another topic of the set of topics; and
generating a second response for the second user based on the first voice data, the first response of the second user, the second voice data, and a second solution segment of the first solution.

12. The method of claim 11, further comprising:
receiving third voice data associated with a third user utterance in the conversation in the guided dialog system;
identifying a second topic associated with the third user utterance;
identifying a second solution associated with the second topic; and
generating a third response for the second user based on the first voice data, the first response of the second user, the second voice data, the second response of the second user, the third voice data, and a solution segment of the second solution.

13. A system comprising:
a memory; and
a processor in communication with the memory, the processor being configured to perform operations comprising:
receiving first voice data associated with a first user utterance of a first user in conversation with a second user in a guided dialog system, wherein the second user is an automated agent of the guided dialog system;
identifying from the first voice data a first topic of a set of topics associated with the first user utterance;
identifying a first solution associated with the first topic, the first solution having one or more solution segments for accomplishing a task related to the topic;
generating a first response for the second user based on a first solution segment of the first solution and the first voice data, wherein the first response is generated using a sequence to sequence machine learning model comprising a generative pre-trained transformer trained to take the first voice data and the first solution segment as inputs and output the first response; and
relaying, via the second user, the first response to the first user.

14. The system of claim 13, wherein the first topic is identified using a text classification model.

15. The system of claim 13, the processor being further configured to perform operations comprising:
receiving second voice data associated with a second user utterance in the conversation in the guided dialog system;
confirming that the second user utterance is not associated with another topic of the set of topics; and
generating a second response for the second user based on the first voice data, the first response of the second user, the second voice data, and a second solution segment of the first solution.

16. The system of claim 15, the processor being further configured to perform operations comprising:
receiving third voice data associated with a third user utterance in the conversation in the guided dialog system;
identifying a second topic associated with the third user utterance;
identifying a second solution associated with the second topic; and
generating a third response for the second user based on the first voice data, the first response of the second user, the second voice data, the second response of the second user, the third voice data, and a solution segment of the second solution.

17. A computer program product comprising a non-transitory computer readable storage medium having program instructions embodied therewith, the program instructions executable by a processor to cause the processor to perform operations, the operations comprising:
receiving first voice data associated with a first user utterance of a first user in conversation with a second user in a guided dialog system, wherein the second user is an automated agent of the guided dialog system;
identifying from the first voice data a first topic of a set of topics associated with the first user utterance;
identifying a first solution associated with the first topic, the first solution having one or more solution segments for accomplishing a task related to the topic;
generating a first response for the second user based on a first solution segment of the first solution and the first voice data, wherein the first response is generated using a sequence to sequence machine learning model comprising a generative pre-trained transformer trained to take the first voice data and the first solution segment as inputs and output the first response; and
relaying, via the second user, the first response to the first user.

18. The computer program product of claim 17, wherein the first topic is identified using a text classification model.

19. The computer program product of claim 17, the processor being further configured to perform operations comprising:
receiving second voice data associated with a second user utterance in the conversation in the guided dialog system;
confirming that the second user utterance is not associated with another topic of the set of topics; and
generating a second response for the second user based on the first voice data, the first response of the second user, the second voice data, and a second solution segment of the first solution.

20. The computer program product of claim 19, the processor being further configured to perform operations comprising:
receiving third voice data associated with a third user utterance in the conversation in the guided dialog system;
identifying a second topic associated with the third user utterance;
identifying a second solution associated with the second topic; and
generating a third response for the second user based on the first voice data, the first response of the second user, the second voice data, the second response of the second user, the third voice data, and a solution segment of the second solution.

* * * * *